(12) United States Patent
Wawrla

(10) Patent No.: US 9,359,747 B2
(45) Date of Patent: Jun. 7, 2016

(54) SANITARY FITTING COMPRISING A FITTING HOUSING AND AN ELECTRICAL CONTROL UNIT

(75) Inventor: Andreas Wawrla, CH-Widnau (CH)

(73) Assignee: AQUIS Sanitaer AG, Rebstein (CH)

( * ) Notice: Subject to any disclaimer, the term of this patent is extended or adjusted under 35 U.S.C. 154(b) by 287 days.

(21) Appl. No.: 14/004,885

(22) PCT Filed: Mar. 14, 2012

(86) PCT No.: PCT/EP2012/001132
§ 371 (c)(1),
(2), (4) Date: Dec. 18, 2013

(87) PCT Pub. No.: WO2012/123112
PCT Pub. Date: Sep. 20, 2012

(65) Prior Publication Data
US 2014/0101844 A1    Apr. 17, 2014

(30) Foreign Application Priority Data
Mar. 14, 2011   (DE) .......................... 10 2011 013 914

(51) Int. Cl.
*E03C 1/04*   (2006.01)
*E03C 1/05*   (2006.01)
*F03B 13/00*  (2006.01)

(52) U.S. Cl.
CPC ................. *E03C 1/0401* (2013.01); *E03C 1/04* (2013.01); *E03C 1/0404* (2013.01); *E03C 1/055* (2013.01); *E03C 1/057* (2013.01); *F03B 13/00* (2013.01); *F05B 2220/602* (2013.01); *Y02B 10/50* (2013.01)

(58) Field of Classification Search
CPC ...................................................... E03C 1/0401
USPC ....................................................... 4/675–678
See application file for complete search history.

(56) References Cited

FOREIGN PATENT DOCUMENTS

| | | |
|---|---|---|
| DE | G 89 02 238.6 U1 | 7/1989 |
| DE | 39 05 759 C1 | 3/1990 |
| DE | 100 22 350 A1 | 11/2001 |
| DE | 10 2006 060 929 B4 | 11/2008 |
| EP | 0 400 688 B1 | 11/1997 |
| JP | 2008-248474 | 10/2008 |
| WO | WO 2012/123112 A1 | 3/2012 |

*Primary Examiner* — Lori Baker
(74) *Attorney, Agent, or Firm* — Breneman & Georges

(57) ABSTRACT

A sanitary fitting having a fitting housing with an electrical control unit for controlling the water flow through at least one water line which sanitary fitting can be maintained or repaired with particularly little effort particularly in applications involving vandalism. This is achieved by having a fitting housing that can be firmly fixed at the installation site with an assembly cover, which can be released from the fitting main body and which covers electrical control unit, turbine and hydraulic control elements within the fitting housing main body and which provides direct access for maintenance and servicing purposes.

20 Claims, 4 Drawing Sheets

SANITARY FITTING COMPRISING A FITTING HOUSING AND AN ELECTRICAL CONTROL UNIT

CROSS-REFERENCE TO RELATED APPLICATIONS

This application contains subject matter related to U.S. application Ser. No. 14/004,893 filed Sep. 12, 2013 titled SANITARY FITTING COMPRISING A FITTING HOUSING AND A CONTROL UNIT and U.S. application Ser. No. 14/004,898 filed Sep. 12, 2013 and titled SANITARY FITTING HAVING A FITTING HOUSING AND A CONTROL UNIT.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS WEB)

Not Applicable.

STATEMENT REGARDING PRIOR DISCLOSURES BY THE INVENTOR OR A JOINT INVENTOR

Not Applicable.

REFERENCE TO A "MICROFICHE APPENDIX"

Not Applicable.

BACKGROUND OF THE INVENTION (1) Field of the Invention

The invention relates to a "sanitary fitting having a fitting housing and a control unit" as per the preamble of claim 1.

(2) Description Of Related Art Including Information Disclosed Under 37 C.F.R. §1.97 and 1.98

Documents DE 100 22 350 A1 or DE 10 2006 060 929 B4, for example, disclose sanitary fittings having a fitting housing and having a control unit, wherein a shut-off valve is arranged within a fitting holder. The fitting holder is, and remains, fixedly connected to the installation site of the fitting. The installation site may in this case be a sanitary body such as a washbasin, etc., or may be a countertop.

By contrast, the fitting housing can be easily removed from the fitting holder, wherein, at the same time, one or more shut-off valves shut off or lock the water lines. Correspondingly, the water lines are simultaneously opened again when the fitting housing is connected to the fitting holder.

Said fittings permit, for example, maintenance or repair of individual components of the fitting, such as for example mixing valve or dirt filter, or an exchange of the batteries/storage batteries or of further electrical components in the case of electrical fittings, without water escaping from the lines and without it being necessary to close the angle valves, which are normally arranged below the washbasin, of the water lines.

This is advantageous because, for example in the case of bathtubs or the like, such angle valves are not (easily) accessible or are not provided. The latter applies in particular also in public or semi-public areas where such angle valves would be manipulated or even damaged through vandalism.

Specifically for applications in public or semi-public areas, however, easily dismountable fittings mentioned in the introduction cannot be used specifically owing to the problem of vandalism, because such fittings would already be damaged or even removed within a short period of time.

Furthermore, systems are already known in which turbines are used for generating electricity in order to entirely or partially generate the energy requirement of electronic sanitary devices. In this way, it is possible, if appropriate, to dispense with a mains connection, which is advantageous specifically in the case of sanitary fittings at existing installation sites being retrofitted with or exchanged for electrical fittings. For example, DE 39 05 759 discloses a water fitting with a turbine, wherein the turbine unit is seated within a closed pipe.

Document EP 0 400 688 B1 likewise describes a water fitting which comprises a turbine with an electrical generator. Here, the turbine is seated within a water-conducting housing which can be opened and closed by means of a cover. The generator and storage battery unit, which is connected to the turbine via a drive shaft, is seated above the cover.

In the case of both of the latter fittings from the prior art, it is disadvantageous that the turbine is only poorly accessible.

BRIEF SUMMARY OF THE INVENTION

It is an object of the invention to propose a sanitary fitting of the type mentioned in the introduction which can be maintained or repaired with particularly little effort, specifically also in applications in which the demands with regard to intentional destruction (vandalism) are of considerable significance.

The object is achieved by means of a sanitary fitting having the features of claim 1. Advantageous embodiments and refinements of the invention are possible by means of the measures specified in the dependent claims.

According to the invention, the turbine is arranged in the region of the housing opening. In this way, it is achieved that said turbine is particularly easily accessible for maintenance and repair purposes.

Furthermore, in one specific embodiment, a water line may be provided which is separate from the housing at least in the region of the turbine and in which the turbine or the turbine housing is arranged.

It is thus possible even during ongoing operation, that is to say while water is flowing through or flowing out, for the turbine or the corresponding turbine components to be monitored or measured. This refers firstly to the mechanical turbine components such as blade wheel or bearing arrangement and also to the electrical components such as electrical generator, electricity store or electronic electricity storage components or the like.

In one advantageous embodiment, the generator and/or a storage battery and/or a control unit for control of the fitting are/is also arranged in the region of the housing opening.

According to the invention, it is basically highly advantageous for the turbine including the generator and if appropriate an electricity store or the like to be provided below the assembly cover in the fitting housing. In this way, the accessibility of said advantageous components is considerably improved in relation to the prior art. In general, the arrangement of the turbine according to the invention, if appropriate with generator and/or further components, permits an optimization of maintenance, repair and/or spatial requirement.

With the aid of the assembly cover according to the invention in combination with the at least one turbine, which is arranged within the fixedly installed fitting housing and which drives an electrical generator, for the utilization of the flow energy of the water flow, it is achieved that said turbine can be accommodated not only in a space-saving manner but also so as to be protected against destruction.

In one particular refinement of the invention, the turbine is arranged in the region of the water outlet, that is to say in the region of the water flow or of the water line of the sanitary fitting according to the invention, in which a relatively low pressure prevails. A corresponding arrangement in the region of the water outlet advantageously permits particularly good accessibility to the respective components. The turbine or the turbine blade wheel is advantageously designed so as to exhibit relatively high efficiency at relatively low pressure. Here, above all, the conversion of the flow energy into mechanical energy and subsequently into electrical energy by means of the electrical generator is realized primarily by means of the volume flow. An adaptation of the turbine or of the at least one turbine blade to said particular hydraulic boundary conditions leads to an advantageous energy yield.

It is preferable for at least one shut-off device which has a second control element and which serves for shutting off the water line to be provided within the fitting housing. Here, the second control element preferably shuts off the water flow or the water line/water lines in an advantageous manner such that downstream hydraulic and if appropriate electrical components, such as for example dirt filter, mixing valve, throughflow valve, throughflow limiter, jet regulator, the turbine with electrical generator, water line sections, seals or the like, can be serviced, in particular removed, that is to say dismounted, and replaced or repaired without water escaping. For this purpose, according to the invention, no conventionally below the sanitary body such as washbasin or the like is necessary, or this need not additionally be turned off or closed. Accordingly, said angle valve or upstream shut-off valve may also be completely or always omitted when using the sanitary fitting according to the invention, which reduces costs and assembly outlay.

It is preferably possible for the fitting housing to be firmly fixed at the installation site and the assembly cover is preferably arranged or mounted on the fitting main body so as to be secured against intentional destruction. For this purpose, said assembly cover can advantageously be fitted in an inconspicuous manner. For example, the edge may be "concealed" or disguised as a design line, such that inexperienced persons cannot even recognize that a separate cover is provided here.

Secondly, a special tool may be provided for releasing or dismounting the assembly cover. In this way, too, it is possible, as an alternative to or in combination with the "disguise", for dismounting through vandalism to be prevented in an effective manner.

It is advantageously provided that the turbine is located a short distance upstream of the water outlet of the fitting, and/or that the turbine is positioned substantially horizontally.

The second control element is preferably arranged upstream of the first control element as viewed in the flow direction of the water flow. In this way, the first control element or valve does not need to be actuated in order, if required, to dismount or service relevant components of the fitting according to the invention.

In one advantageous variant of the invention, it is provided that, in the region of the turbine, the water line is formed as a turbine housing. In this way, the flow conditions at one or more turbine wheels can be optimized, and thus the electrical efficiency can be improved.

Furthermore, in said advantageous variant of the invention, it is possible, with the assembly cover dismounted, for the turbine including the generator and if appropriate further components for energy generation and/or storage to be monitored or measured, or checked, even during operation. This is of major significance, in particular in the event of a fault or damage to the turbine components, in order to be able to determine the specific fault or the damage. Accordingly, by means of the design of the sanitary fitting according to the invention with the turbine and generator etc. arranged in the region of the assembly cover, accessibility and repair and ease of maintenance are considerably improved in relation to the prior art. This is of particular significance above all for mechanical components of relatively small dimensions in the energy generation system with turbine and, if appropriate, step-up gearing etc. According to the invention, not only is it possible to perform advantageous inspection of the components for energy generation with a turbine, but it is also possible to carry out fault analysis and an exchange of the overall system or of individual components.

It is basically possible for an axis of rotation of the turbine and/or of the one or more turbine wheels to be arranged concentrically with respect to or as an elongation of an axis of rotation of the electrical generator. This is advantageous in the case of relatively long and, if appropriate, relatively thin sanitary fittings or areas.

An axis of rotation of a turbine blade wheel of the turbine is preferably arranged substantially parallel to an axis of rotation of the generator. This is particularly advantageous above all if a step-up gearing is arranged between the turbine and the generator in order to improve the generation of electricity by means of higher rotational speeds of the generator. The step-up gearing may then be designed such that the parallel offset is overcome and, at the same time, a higher rotational speed of the generator is realized. In this way, it is possible to realize particularly advantageous step-up transmission ratios, in particular greater or better step-up transmission ratios than in the case of components arranged more concentrically or one behind the other.

The generator and/or the step-up gearing are/is advantageously arranged within a water-tight generator housing. Advantageous protection of the electrical and/or relatively sensitive mechanical components is attained in this way.

In one particular refinement of the invention, the fitting housing and/or the mounted assembly cover forms, together with the generator housing, the turbine housing. In this way, a separate turbine housing may be dispensed with, which above all reduces outlay. By means of the mounting of the relevant components, an advantageous impingement of flow on, or flow around, the turbine or the one or more turbine wheels is generated.

In one particular variant of the invention, at least one shut-off device which has a second control element and which serves for shutting off the water line is arranged within or on the fitting housing. In this way, it is possible for individual components or all of the relevant components of the fitting to be serviced or exchanged/repaired. Here, the second control element preferably shuts off the water flow or the water line/water lines in an advantageous manner such that downstream hydraulic and if appropriate electrical components, such as for example dirt filter, mixing valve, throughflow valve, throughflow limiter, jet regulator, water turbine with electrical generator, water line sections, seals or the like, can be serviced, in particular removed, that is to say dismounted, and replaced or repaired without water escaping. For this purpose, no angle valve conventionally arranged below the sanitary body such as washbasin or the like is necessary, or said angle valve need not additionally be turned off or closed. Accordingly, said angle valve or upstream shut-off valve may also be completely or always omitted when using the sanitary fitting according to the invention, which reduces costs and assembly outlay.

The cross section of the housing opening is advantageously larger than a cross section of the turbine and/or of the generator and/or of the step-up gearing and/or of the generator housing and/or of the first control element and/or of a dirt filter for filtering the water flow and/or of at least one throughflow regulator for regulating the water flow rate. In this way, the electrical or first control element and/or the dirt filter and/or the throughflow limiter and/or the turbine and/or the generator and/or the gearing etc. may advantageously be removed in each case individually, and/or jointly as a service unit or structural unit, from the fitting housing via the free assembly opening. Dismounting of the entire fitting or of the fitting housing can be dispensed with. This is highly advantageous, in particular for maintenance/service or repair, specifically with regard to vandalism in public or semi-public areas. Not only hydraulic components but also electrical components can, according to the invention, be advantageously removed and reinstalled through the assembly opening.

It is advantageous for at least one dirt filter for filtering the water flow and/or at least one throughflow regulator for regulating the water flow rate to be provided. It is achieved in this way that the electrical or first control element or throughflow valve is formed as a service unit or a valve unit together with essential hydraulic components, and can be dismounted from and reinstalled in the fitting main body in an advantageous manner. This may be necessary for example for maintenance, servicing, repair and replacement. This improves the economical operation of the sanitary fitting according to the invention.

It is preferable for at least one actuation unit to be provided for the actuation of the second control element. In the case of a mechanical first control element or throughflow valve, this may be in the form of a rotary handle and/or lever and/or in the form of the assembly cover.

In one particular refinement of the invention, the actuation unit is in the form of a fixing device for fixing and releasing of the electrical or first control element and/or the valve unit or service unit. It is achieved in this way that the water line or the water flow is shut off or blocked already during the dismounting or release of the electrical control element or of the service unit. A corresponding arrangement may also be realized with regard to the dirt filter and/or throughflow limiter and/or the turbine and/or the electrical generator or the like. That is to say that simply the release/dismounting or removal of the first control element and/or of the service unit has the effect that, simultaneously or in a manner directly coupled therewith, the second control element/shut-off valve or shut-off device that has hitherto been open is closed too. Thus, the shut-off water line is simultaneously severed. A corresponding situation applies to the mounting process or the fixing of the first control element/service unit, and the opening, coupled therewith, of the second control element or of the shut-off device.

The shutting-off of the second control element preferably takes place at least partially by means of a rotational movement or a rotational travel, in particular by means of rotation during the release of the first or electrical control element. For example, the fixing device is in the form of a bayonet coupling. An advantageous shutting-off and sealing of the water line or of the water flow in the fitting is attained in this way. The valve unit or the first control element or the like is rotated for example counterclockwise for example by means of a bayonet (for example 60°), the second control element or service valve is then closed, and the first control element or the entire valve unit together with filter, throughflow regulator and magnetic valve etc. can be removed. Installation takes place in the reverse sequence.

It is basically possible for the first and/or indeed the second control element to be formed as a purely mechanical shut-off valve with an actuation element in the form of a rotary handle, lever or the like. Alternatively, or in combination with this, it is also possible for an electrical and if appropriate also manually actuable first control element/valve, by means of which the water outlet is regulated, to be provided. In the case of an electrical actuation, this may advantageously be realized by means of a sensor, infrared sensor or the like, and/or by means of an electrical switch as an actuation element.

It is also conceivable for the assembly cover to be formed as an actuation element of the second control element or shut-off valve and/or for a blocking unit to be placed in operative connection with the assembly cover, such that for example a mechanism actuates the second control element. It is achieved in this way that the water flow is shut off or blocked already upon the dismounting or opening of the assembly cover.

In one advantageous variant of the invention, the assembly cover comprises at least one actuation element for actuating in particular the first and/or if appropriate the second control element. It is advantageously possible in this way for the outflow of water to be manually started and/or stopped by the user.

The assembly cover advantageously comprises at least one solar cell for solar electricity generation and/or comprises a display unit for displaying parameters of the water flow and/or parameters of the control unit. In this way, it is possible to realize substantially energy-autonomous operation, and/or to provide for the user an advantageous display of essential parameters or information relating to the sanitary fitting according to the invention. Such parameters or information may for example be actual temperature of the water, set nominal temperature, whether or not a fault is present and/or at which component a fault is present, automatic timing, a set water outflow duration, energy reserves of the battery/storage battery, or the like.

Particular designs of the sanitary fitting according to the invention may be realized in combinations or as alternatives, wherein there is in each case provided an electronic sanitary fitting, wherein, in the fitting body, there is integrated a shut-off valve for the water feed, which shut-off valve can preferably be opened and closed by means of a unit and is opened/closed upon the removal/installation of a service module or the like (unit hereinafter=service module)

the service module is the actuation element of the shut-off valve, the shut-off valve is opened/closed by means of a rotational movement, in that the service module comprises a valve, in that the service module comprises a flow rate limiter, in that the service module comprises a dirt filter, in that the service module is mounted/dismounted by means of a rotational movement, for example bayonet coupling, in that the service module is implemented with a color coding for distinguishing between different designs, in that the service module can be installed/removed only in a positioning manner.

Particular advantages of the invention:

Normal washbasin fittings are usually connected by hoses or pipes to angle valves. The angle valves serve for shutting off the water supply when repair or maintenance work has to be performed on the fitting.

Such maintenance work includes for example the dirt screens having to be cleaned or exchanged. The angle valves are often only poorly accessible, below the washbasin, and are often accessible with particular difficulty owing to fixtures below the washbasin.

It is achieved according to the invention that the maintenance and repair work is made possible in a particularly simple manner and with easy access. The invention makes it possible for all the work on all of the hydraulic components to be performed "above the washbasin", without the fitting being dismounted and without the need to operate any shut-off elements for the water supply.

The water supply is preferably automatically interrupted/shut off (within the fitting body) as a result of the removal of the service unit. It is thus possible for all maintenance work to be performed in a convenient and simple manner. Upon reinstallation, the integrated shut-off valve is opened again, and the fitting is ready for use.

BRIEF DESCRIPTION OF THE SEVERAL VIEWS OF THE DRAWINGS

An exemplary embodiment of the invention is illustrated in the drawing and will be explained in more detail below on the basis of the figures, with further advantages being indicated.

In detail.

DETAILED DESCRIPTION OF THE INVENTION INCLUDING BEST MODE

Figure 1:
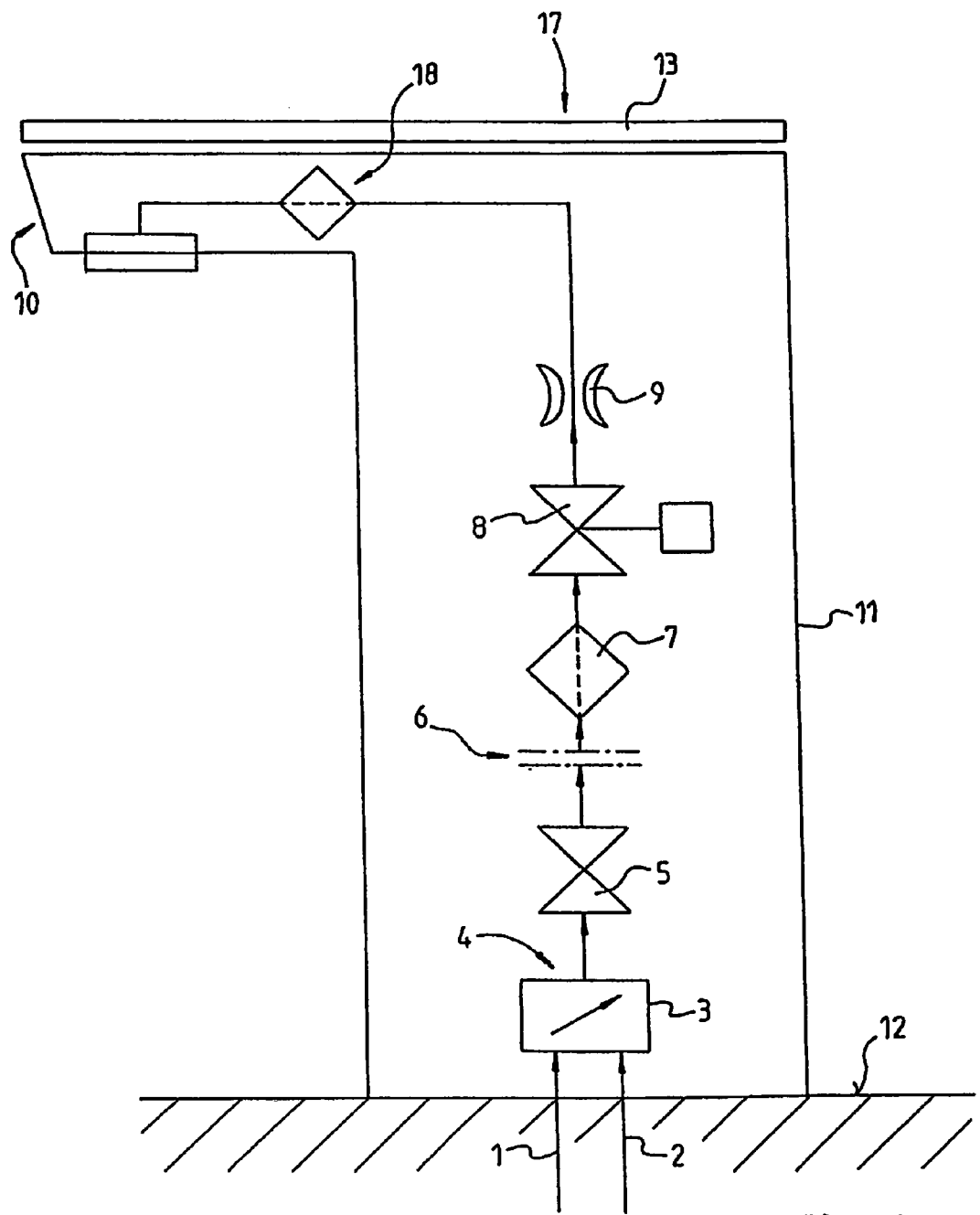
FIG. 1 shows a schematic block circuit diagram of a sanitary fitting according to the invention.
Figure 2:
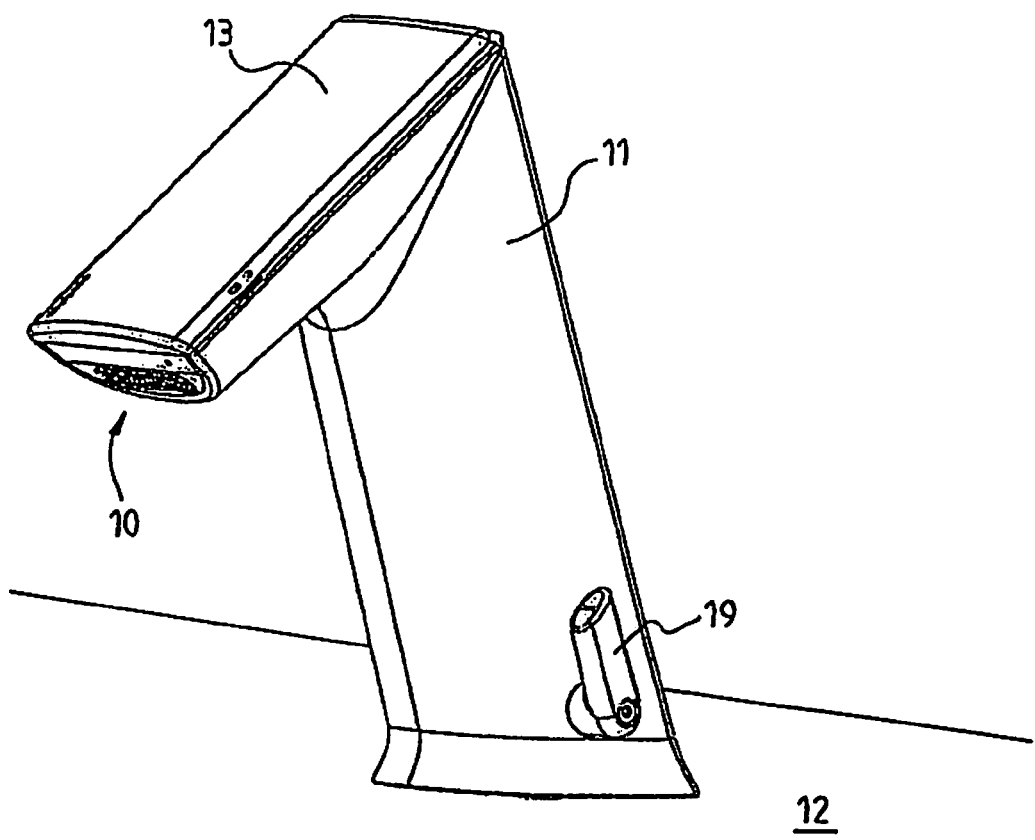
FIG. 2 shows a schematic illustration of a sanitary fitting according to the invention.

A sanitary fitting may optionally be operated with only one (cold) water feed 1, 2 or with two (hot and cold) water feeds 1, 2. In the latter case, a mixing valve 3 should preferably be provided such that the mixed water flows in a common water line 4.

A first control element 5 or shut-off valve 5 permits a separation at a (symbolically indicated) interface 6. The valve 5 is preferably actuated by virtue of a second control element 8 or a so-called valve unit 8 being dismounted, in particular removed by means of rotation or a bayonet coupling, such that the valve 5 is simultaneously closed.

The valve unit 8 preferably comprises a dirt filter 7 and a throughflow limiter 9 which are arranged, as viewed in the flow direction, downstream of the valve 5 or of the interface 6.

In addition to a turbine 18 with electrical generator, a solar cell 17 may optionally also be provided, such that, according to the invention, primarily the flow energy of the water is converted into electrical energy. For example, batteries or storage batteries 14 are provided for supplying energy to the electrical components (if appropriate valve 8, display 16 and/or LED display, sensor not illustrated in any more detail, etc.) and/or for temporarily storing the electrical energy from the turbine 18 and/or solar cell 17.

An electrical control unit (not illustrated in any more detail) preferably comprises a charge regulator etc. for the storage batteries 14.

A fitting housing 11 is firmly fixed to the washbasin 12 or the like, and an assembly cover 13 can advantageously be released from and mounted/fixed again on the housing 11.

Figure 3A:
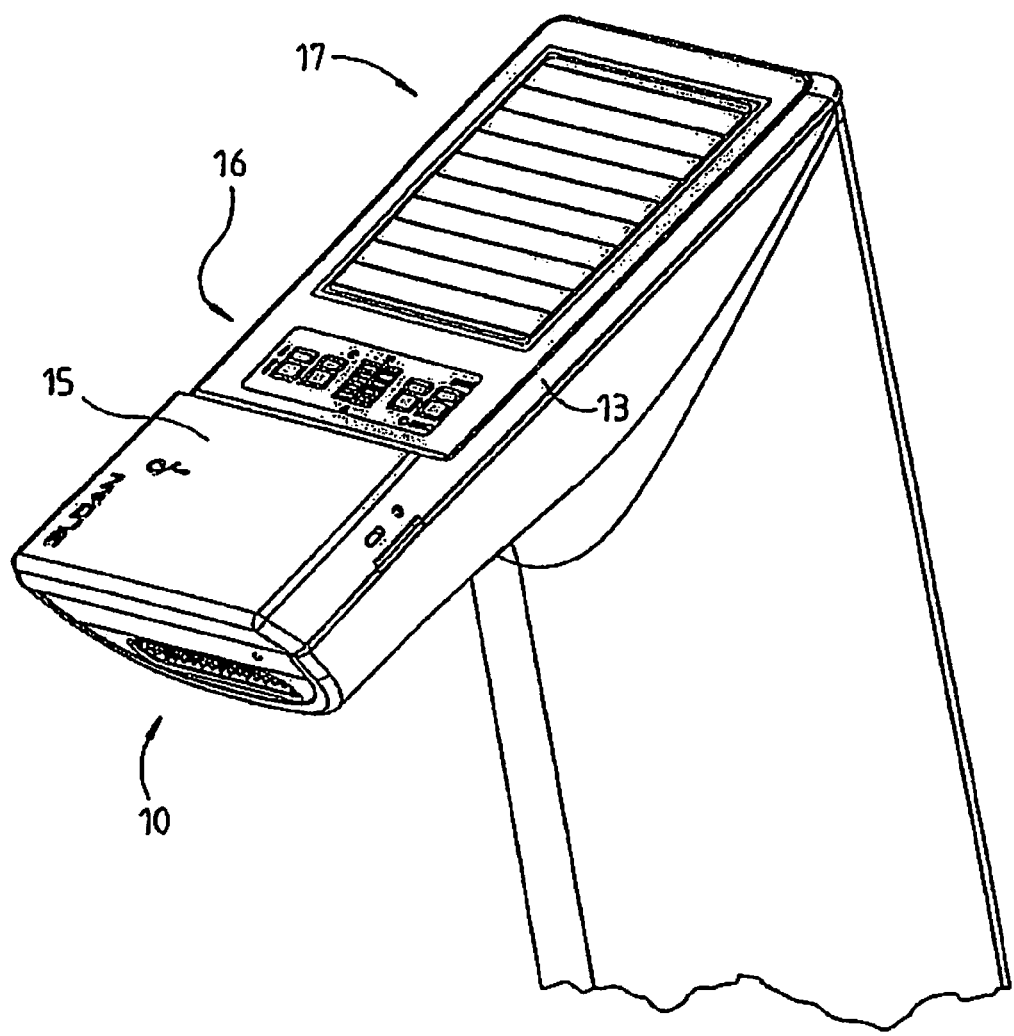
FIG. 3 shows a schematic illustration of a further sanitary fitting with a display according to the invention in a detail and in an exploded illustration.
Figure 3B:
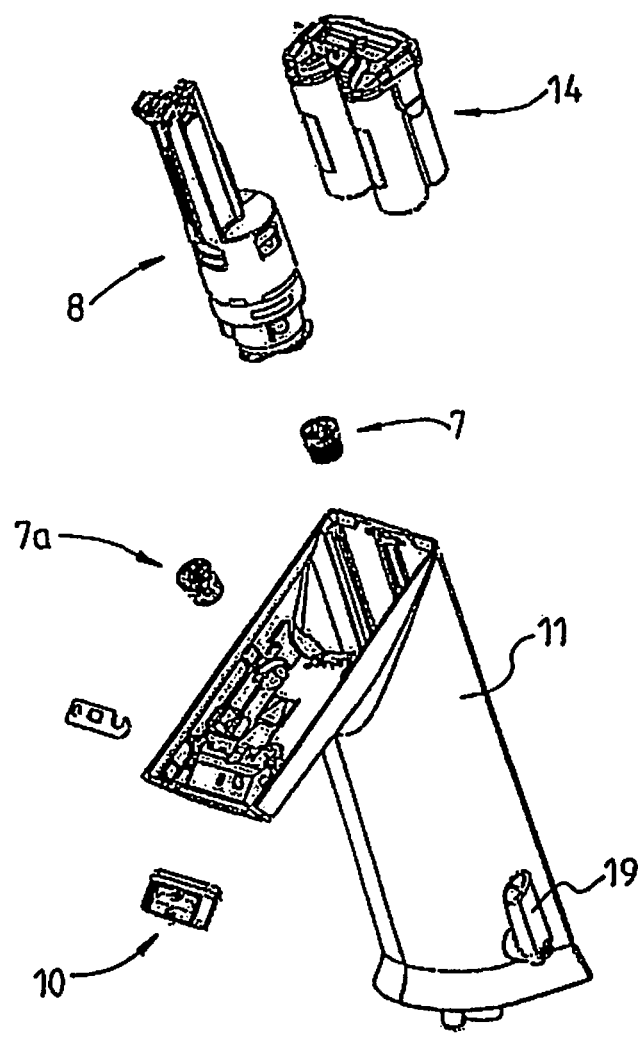

All relevant components can be removed and reinstalled through the free opening 13 of the fitting housing 11. Without being illustrated in any more detail in FIG. 3b), the turbine 18 with generator can advantageously be arranged or mounted in the region directly upstream of the outlet 10 or jet regulator 10, that is to say approximately in the region of an indicated replacement filter 7a). In this case, in the more horizontally oriented portion of the fitting housing 11, there is firstly an advantageous availability of space within the main body 11. Secondly, the turbine 18 with generator is very easily accessible when the assembly cover 13 is dismounted, such that maintenance or repair/exchange can take place without great outlay and if appropriate even while water is flowing through or flowing out.

In the illustrated variant of the sanitary fitting with an oval or more rectangular cross section of the fitting, that is to say in which the width is greater than the height/depth, it is expedient for the turbine 18 and generator to be arranged laterally offset or adjacent one another, and to preferably be connected by means of an advantageous step-up gearing.

For example, through suitable configuration, it is not possible for an inexperienced user to identify that the cover 13 is removable. This is highly advantageous with regard to protection against vandalism.

LIST OF REFERENCE NUMERALS

1 Cold feed
2 Hot feed (optional)
3 Mixing valve (optional)
4 Mixed water
5 Service valve=shut-off valve
6 Hydraulic interface
7 Filter
8 Throughflow valve (may be electrical, mechanical valve, etc.)
9 Throughflow limiter or throughflow regulator
10 Outlet
11 Fitting housing
12 Installation platform (for example washbasin)
13 Assembly cover or opening
14 Storage batteries/batteries
15 Electrical button/switch
16 Display
17 Solar cell (optional)
18 Turbine with generator
19 Temperature adjustment lever (in the case of a
20 mixing valve being used)

What is claimed is:

1. In a sanitary fitting having a fitting housing with an inlet water line and at least one electrically actuatable control element or an electrically actuatable throughflow valve for closing and opening the inlet water line wherein the improvement comprises a releasable assembly cover to open and close the fitting housing for a direct access to at least one turbine connected to an electrical generator disposed directly behind the releasable assembly cover wherein the turbine is arranged or mounted directly upstream and in substantial alignment with the releasable assembly cover and an outlet or a jet regulator in the region of the housing opening behind the releasable assembly cover and is thus directly accessible when the releasable assembly cover is open.

2. The sanitary fitting as claimed in claim 1 wherein at least in the region of the turbine, the inlet water line is not part of the housing, such that the water line remains closed when the assembly cover is opened.

3. The sanitary fitting as claimed in claim 1 further comprising a storage battery wherein the electrical generator and/or the storage battery are/is likewise arranged in the region of the housing opening covered by the releasable assembly cover.

4. The sanitary fitting as claimed in claim 2 wherein in the region of the turbine, the inlet water line is part of a turbine housing.

5. The sanitary fitting as claimed in claim 1 further comprising at least one electrical storage battery.

6. The sanitary fitting as claimed in claim 1 wherein an axis of rotation of a turbine blade wheel of the turbine is arranged substantially parallel to an axis of rotation of the generator.

7. The sanitary fitting as claimed in claim 1 wherein a step-up gearing is arranged between the turbine and the generator.

8. The sanitary fitting as claimed in claim 7 wherein the generator and/or the step-up gearing are/is arranged within a water-tight generator housing.

9. The sanitary fitting as claimed in claim 1 wherein the electrically actuatable control element is combined as a service unit for jointly mounting or dismounting with at least one dirt filter and/or at least one throughflow regulator and/or the electrical generator and/or with the turbine.

10. The sanitary fitting as claimed in claim 9 wherein the cross section of the housing opening is larger than a cross section of the turbine and/or the electrical generator and/or the step-up gearing and/or a housing of the electrical generator and/or of the dirt filter and/or of the throughflow regulator.

11. The sanitary fitting as claimed in claim 1 further comprising at least one shut-off device with a second control element arranged within or on the fitting housing to shut off the inlet water line.

12. The sanitary fitting as claimed in claim 11 further comprising at least one actuation unit to actuate the second control element.

13. The sanitary fitting as claimed in claim 12 wherein the actuation unit is a fixing device for fixing and releasing the electrically actuatable control element and/or a service unit.

14. The sanitary fitting as claimed in claim 1 wherein the releasable assembly cover has at least one solar cell for solar electricity generation and/or a display unit for displaying parameters of water flow and/or parameters of a control unit.

15. A sanitary fitting housing comprising:
(a) a sanitary fitting housing having an inside and an outside and a water inlet and a water outlet or a jet regulator;
(b) an electrically actuatable water control valve disposed on the inside of the sanitary fitting housing connected to the water inlet;
(c) an actuator unit disposed on the inside of the sanitary fitting housing and connected to the electrically actuatable water control valve;
(d) at least one turbine with an electrical generator arranged or mounted directly upstream to the water outlet or the jet regulator said at least one turbine having wheels arranged concentrically with respect to an elongation axis of rotation of the electrical generator; and
(e) a releasable assembly cover to directly cover over the at least one turbine with the electrical generator and close the inside of the sanitary fitting housing from the outside of the sanitary fitting housing, the assembly cover having a solar cell.

16. The sanitary fitting housing of claim 15 further comprising an energy store or battery for storing electrical energy produced by the electrical generator or from the solar cell on the releasable assembly cover.

17. A fitting housing having an electrical control unit comprising:
(a) a fitting housing having at least one inlet water line and a water outlet line;
(b) a releasable cover assembly to close an inside of the fitting housing from an outside of the fitting housing;
(c) an electrically actuatable control valve disposed inside of the fitting housing;
(d) at least one turbine disposed behind the releasable cover assembly inside the fitting housing and connected to an electrical generator said at least one turbine directly connected to the water outlet line or a jet regulator in substantial horizontal alignment with the water outlet line and the releasable cover assembly disposed inside the fitting housing and wherein the water outlet line is a part of the turbine housing; and
(e) an electricity store connected to the electrically actuatable control valve and the electrical generator connected to the turbine.

18. The fitting housing of claim 17 wherein the releasable cover assembly is an actuation unit which actuates the electrically actuatable control valve to close the water line.

19. The fitting housing of claim 17 further comprising an actuation unit to activate the electrically actuatable control valve to close the inlet water line.

20. The fitting housing of claim 17 further comprising at least one solar cell and/or display unit disposed on the releasable cover assembly.

* * * * *